Jan. 15, 1924.

L. THEORET

AXLE CONSTRUCTION

Filed April 2, 1923

1,480,642

Lionel Theoret
INVENTOR

BY *Victor J. Evans*
ATTORNEY

WITNESS: *R. E. Wise,*

Patented Jan. 15, 1924.

1,480,642

UNITED STATES PATENT OFFICE.

LIONEL THEORET, OF ASQUITH, SASKATCHEWAN, CANADA.

AXLE CONSTRUCTION.

Application filed April 2, 1923. Serial No. 629,505.

*To all whom it may concern:*

Be it known that I, LIONEL THEORET, a subject of the King of Great Britain, residing at Asquith, in the Province of Saskatchewan and Dominion of Canada, have invented new and useful Improvements in Axle Constructions, of which the following is a specification.

This invention relates to axle constructions for tractors and the like and has for its object the provision of a novel axle formed of telescopically engaged sections, the respective sections carrying the necessary differential gears to effect proper driving of the vehicle.

It is well known in the art that the axle construction of a tractor is a difficult proposition. Heavy tractors have a one piece axle with gears on the outside exposed to dust which is a great disadvantage inasmuch as any accumulation of grit on these gears causes rapid wear thereof. Some other types of tractors have two stub axles provided at their inner ends with gears forming part of the differential gearing and having their outer ends carrying the drive wheels of the tractor. The disadvantage of this type is that the axle has a tendency to cut in the bearing next to the wheel. It is with these various facts in view that I have designed the present axle construction which embodies a main section and two sleeve like sections engaged exteriorly thereon.

An additional object is the provision of an axle of this character which will be simple and inexpensive in manufacture, highly efficient in use, durable in service and a general improvement in the art.

With the above and other objects and advantages in view the invention consists in the details of construction to be hereinafter more fully described and claimed and illustrated in the accompanying drawings, in which:

Figure 1:
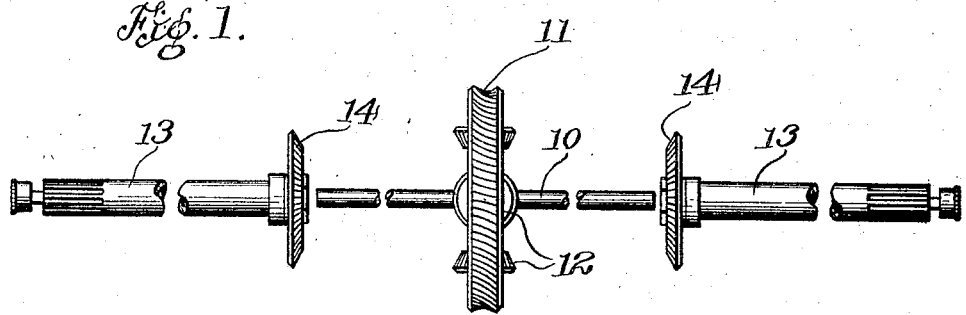
Figure 1 is an elevation of the various parts of the axle disconnected.
Figure 2:
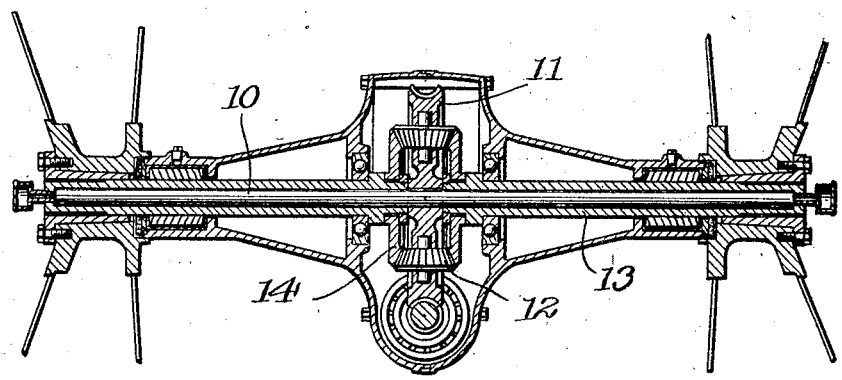
Figure 2 is a longitudinal section showing the parts assembled.
Figure 3:
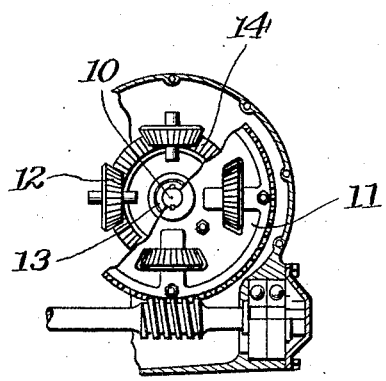
Figure 3 is a cross section.

Referring more particularly to the drawings I have shown the axle as comprising a main or central section 10 on the center of which is secured the main gear 11 adapted to be driven by a suitable gear on the drive shaft not shown, and this gear 11 carries a plurality of bevel differential gears 12. Rotatably mounted and slidably engaged upon the end portions of the shaft 10 are hollow shafts or sleeves 13 which have their outer ends constructed to have the tractor wheels secured thereon, and which have their inner ends carrying beveled gears 14 which mesh with the differential gears 12 in the customary manner. The device is installed as indicated in Figure 2 of the drawings and is used in the same manner as any other axle and its operation is the same except that it possesses the advantage of having the relatively movable sections supported by the main section so that regardless of what strain may be placed upon the axle it will have the necessary strength and rigidity to insure most efficient action.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

In an axle construction, a housing, a solid axle extending throughout the length thereof, a ring gear rigidly secured upon the center of said axle and carrying a plurality of differential pinions, a pair of hollow axle sections engaged upon said solid axle and having their inner ends reduced and threaded, bevel gears on said reduced ends meshing with said pinions, nut members screwed onto said reduced ends for holding said gears on the hollow axle sections, circular supporting members within the housing outwardly of said last named gears, bearing elements carried by said circular members, other bearing elements carried by the hollow axle sections and co-operating with said first named bearing elements, the axle sections having enlargements engaging against the last named gears and the last named bearing elements, and wheels secured upon the outer ends of said hollow axle sections.

In testimony whereof I affix my signature.

LIONEL THEORET.